United States Patent [19]

Gilgen

[11] Patent Number: 4,592,676
[45] Date of Patent: Jun. 3, 1986

[54] ARRANGEMENT FOR DAMMING WATER AND ALSO FOR DRAINING AWAY THE VOLUME OF WATER ABOVE A CERTAIN LEVEL IN A VEGETATION-BEARING STRATUM

[76] Inventor: Hans Gilgen, Neuwilerstrasse 60, CH-4104 Oberwil, Switzerland

[21] Appl. No.: 617,965

[22] Filed: Jun. 7, 1984

[30] Foreign Application Priority Data

Jun. 10, 1983 [DE] Fed. Rep. of Germany ....... 3321096

[51] Int. Cl.$^4$ ............................................. E04D 13/04
[52] U.S. Cl. ........................................ 405/36; 405/52; 210/164
[58] Field of Search ................. 405/36, 52; 285/302; 210/163, 164, 165

[56] References Cited

U.S. PATENT DOCUMENTS

| | | | |
|---|---|---|---|
| 2,400,070 | 5/1946 | Boosey | 210/165 |
| 2,912,111 | 11/1959 | Kovac | 285/302 X |
| 3,246,582 | 4/1966 | Wade et al. | 210/164 X |
| 3,774,765 | 11/1973 | Kane et al. | 210/164 |
| 4,460,462 | 7/1984 | Arneson | 210/163 |
| 4,483,396 | 11/1984 | Kennelly | 285/302 X |

FOREIGN PATENT DOCUMENTS 6601651 8/1966 Netherlands ...................... 210/165
6604578 10/1966 Netherlands ...................... 210/164

Primary Examiner—Dennis L. Taylor
Attorney, Agent, or Firm—Fitzpatrick, Cella, Harper & Scinto

[57] ABSTRACT

The invention relates to an arrangement for damming water and also for draining away the volume of water above a certain level in a vegetation-bearing stratum. Arrangements of this type normally have on the base consisting, for example, of concrete, a sealing layer and on top of this a root protection sheet. In addition, the base has an inlet channel for the water. The primary purpose of the arrangement is to ensure that the water located between the sealing layer and the root protection sheet is carried away into the inlet channel. The arrangement also consists of a pipe socket set with clearance in the inlet channel and which is provided externally with a plate-like flange next to its upper edge and, additionally, with a water-damming pipe arranged at an adjustable height in the pipe socket, the exterior of this pipe being sealed in respect of the interior of the pipe socket. The plate-like flange of the pipe socket is joined so as to be sealed in respect of the roots to the edge region of the root protection sheet surrounding a drainage hole in the root protection sheet.

4 Claims, 1 Drawing Figure

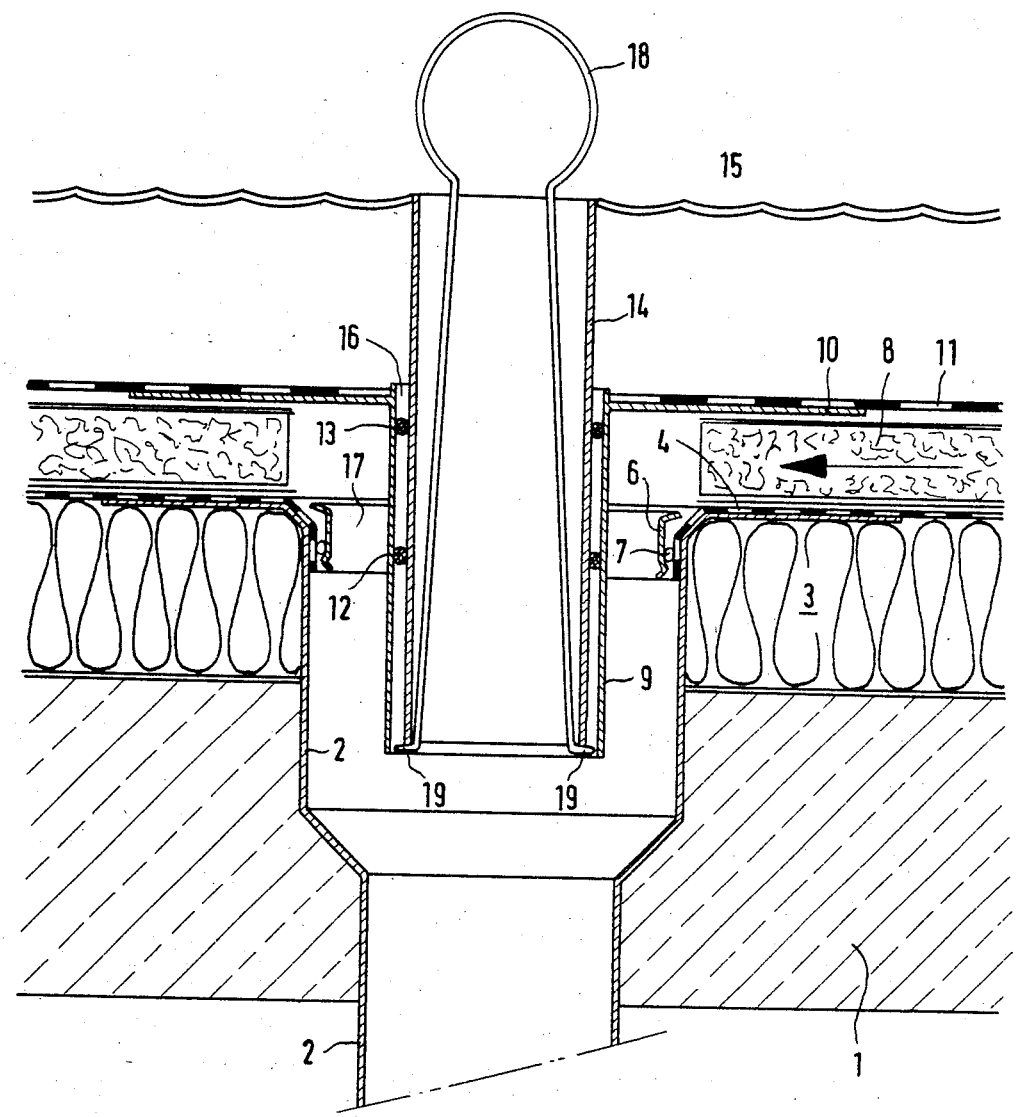

ARRANGEMENT FOR DAMMING WATER AND ALSO FOR DRAINING AWAY THE VOLUME OF WATER ABOVE A CERTAIN LEVEL IN A VEGETATION-BEARING STRATUM

The invention relates to an arrangement for damming water and also for draining away the volume of water above a certain level in a vegetation-bearing stratum which is disposed on a base covered by a sealing layer having a root protection sheet or barrier course disposed between the vegetation-bearing stratum and the sealing layer, having an inlet channel provided in the base and which is open at the top, having a drainage hole in both the sealing sheet and the root protection sheet, which holes are positioned above the inlet channel-opening, having a pipe socket set into the inlet channel and which is provided externally next to its upper edge with a plate-like flange, and having a water-damming pipe arranged at an adjustable height in the pipe socket, its exterior being sealed in respect of the interior of the pipe socket.

An arrangement of this kind is known. It is used in particular for roof gardens. In the known arrangement the edge region surrounding the drainage hole in the sealing layer is joined in a water-tight manner by glueing or bonding to the plate-like flange of the pipe socket. The sealing layer is formed by a sealing sheet. The edge region surrounding the drainage hole in the root protection sheet is merely inserted into the pipe socket so that there is no secure attachment. In addition, water collecting between the root protection sheet and the sealing layer cannot flow away. The water may be, for example, condensed water vapor which diffuses through the sealing layer from the building. This water may also have penetrated at the edge of the root protection sheet from outside, for example, where the root protection sheet ends at surfaces which may be walked on. The water collecting between the sealing layer and the root protection sheet may impair thermal insulation with an inverted roof.

The underlying object of the invention is to produce an arrangement of the type described initially so as to ensure that the root protection sheet is attached securely according to the technical conditions to the edge region surrounding the drainage hole and also that any water which might collect between the sealing layer and the root protection sheet is allowed to flow away.

The object is achieved according to the invention by the pipe socket being arranged in the inlet channel with clearance (floating arrangement) and by the plate-like flange of the pipe socket being joined, so as to be sealed in respect of the roots, to the edge region of the root protection sheet surrounding the drainage hole in the root protection sheet.

Water collecting between the root protection sheet and the sealing layer can now run through the gap left by the clearance between the pipe socket and the inlet channel into this channel. As the root protection sheet is now joined to the plate-like flange, it is possible for the edge region surrounding the drainage hole in the root protection sheet to be securely attached, for example, by glueing or bonding, to the plate-like flange.

The solution according to the invention has the additional advantage that the water-damming fittings are independent of the diameter of the inlet channel in the base. The diameter of the pipe socket is selected so that it is always possible for it to be inserted with clearance into inlet channels of the customary diameters.

A further advantage is that when the water-damming fittings are installed, it is no longer necessary to join the sealing layer, usually formed as a sealing sheet, to the plate-like flange of the pipe socket. The sealing layer is normally positioned on the base at a time before the water-damming fittings, for example, when the base is a concrete roof of a building, on which a roof garden is to be provided. The water-damming unit can then be fitted when the roof garden is constructed, which is also when a root protection sheet would be fitted.

In view of the above-mentioned fact, it is substantially easier than before to provide an existing flat roof at a later date with the water-damming fittings, which allows the subsequent building of a roof garden.

The fact that it is still possible for the water-damming pipe to be infinitely adjustable is also advantageous.

It should also be noted that an arrangement is also known in which the pipe socket consists of two pipe sections sliding telescopically one in the other, the two sections having a plate-like flange. The plate-like flange of the pipe section having the wider diameter is joined to the sealing layer as in the initially described arrangement. The plate-like flange of the pipe section having the narrower diameter is joined to the root protection sheet. Although the pipe section having the wider diameter is positioned with clearance in the inlet channel, this does not, however, ensure that water collecting between the sealing layer and the root protection sheet can drain off. In addition, the installation of the two pipe sections serves different purposes. The pipe section having the wider diameter is fitted for the purposes of roof insulation. The pipe section having the narrower diameter is sealed into the pipe section with the wider diameter for the purposes of constructing the roof garden.

Another development of the invention may consist in arranging two elastic sealing rings, made of rubber for example, axially spaced apart between the outer side of the water-damming pipe and the inner side of the pipe socket. The tolerances are advantageously chosen so that the water-damming pipe is secured by the sealing rings such that it is only possible to move it upwards in the pipe socket with the aid of a special tool, for example, a forked tool with hooks at the prong ends engaging under the lower edge of the water-damming pipe. This ensures that any unauthorised raising of the water level to be maintained is impossible or extremely difficult.

Advantageously the hooks are long enough to project as far or almost as far as the inner side of the pipe socket, so that when they draw up the water-damming pipe, they simultaneously secure and lift the sealing rings.

An exemplary embodiment of the invention is described in the following with reference to the drawing which is an elevational view taken in section of a water damming arrangement.

In the drawing the concrete roof of a building is designated by 1. On top of the concrete roof there is a heat-insulating layer 3, for example, polystyrene. The concrete roof 1, the heat insulating layer 3, and also the sealing sheet 4 together form a base for a vegetation-bearing stratum, for example, a roof garden. The vegetation-bearing stratum is not described here in more detail. An inlet channel 2 is concreted into the concrete roof 1.

An inlet channel 2 with a collar which lies on the heat-insulating layer 3, is set in the concrete roof 1.

The heat-insulating layer 3 is covered by a sealing sheet 4. The sealing sheet 4 is provided with an inlet opening 17. The edge region of the sealing sheet 4 surrounding the inlet opening 17 is either inserted into the opening of the inlet channel 2 and held therein by a fastening ring 6 and also an intermediate elastic 0-ring 7 made of rubber, or glued over the entire surface directly to the collar of the inlet channel 2.

An intermediate layer 8 giving mechanical protection lies on top of the water-tight sealing layer 4.

A pipe socket 9 extends into the inlet channel 2 a distance from the inner wall of the inlet channel 2. Next to the upper edge of the pipe socket 9, the latter is provided with a plate-like flange 10 which extends outwards horizontally from the outer side of the pipe socket 9. A root protection sheet 11, impenetrable by the roots, is positioned on top of the intermediate layer 8, and is provided with a drainage hole 16. The edge region of the root protection sheet 11 surrounding the drainage hole 16 is joined in a water-tight manner to the plate-like flange 10, for example, by glueing or bonding.

A water-damming pipe 14 which is held by two rubber ring seals 12, 13 is positioned in the pipe socket 9. The water-damming pipe 14 is held so tightly it can only be moved upwards with the aid of special tool 18. This is made of stainless spring steel and is forked. At each of its prong ends 19 there are hooks which can grip under the lower edge of the water-damming pipe 14. The hooks 19 project so far that when the water-damming pipe 14 is drawn out, the ring seals 12, 13 are also safely drawn out with it. When the tool 18 is not required, it may be removed from the water-damming pipe 14 by pinching it together.

Water for watering the roof garden, the surface of which is designated by 15, builds up above the root protection sheet 11. The level maintained is determined by the height of the upper edge of the water-damming pipe 14.

The arrangement according to the invention is not restricted to the roof sealing construction described. It may also be used for example with roof seals on flat roofs in which the sealing layer extends under the heat-insulating layer. The arrangement according to the invention may also be used in other flat roof constructions.

What is claimed is:

1. An arrangement for damming water and also for draining away the volume of water above a certain level in a vegetation-bearing stratum which is disposed on a base covered by a sealing layer, having a root protection sheet arranged between the vegetation-bearing stratum and the sealing layer, having an inlet channel provided in the base and which is open at the top having a drainage hole in both the sealing sheet and the root protection sheet, which holes are positioned above the inlet channel opening, having a pipe socket set into the inlet channel and provided externally with a plate-like flange next to its upper edge, and having a water-damming pipe arranged in the pipe socket at an adjustable height, its exterior being sealed against the interior of the pipe socket, characterized in that the pipe socket is arranged with clearance in the inlet channel, and that the plate-like flange of the pipe socket is joined so as to be sealed in respect of the roots to the edge region of the root protection sheet surrounding the drainage hole in the root protection sheet.

2. An arrangement according to claim 1, characterized in that two elastic sealing rings, preferably made of rubber, are arranged axially spaced apart between the outer side of the water-damming pipe and the inner side of the pipe socket.

3. Arrangement according to claim 2, characterized in that the water-damming pipe is so securely held by the sealing rings that it can only be moved upwards in the pipe socket with the aid of a special tool, for example, a forked tool with hooks at the prong ends engaging under the lower edge of the water-damming pipe.

4. Arrangement according to claim 3, characterized in that the hooks project as far or nearly as far as the inner side of the pipe socket.

* * * * *